United States Patent
Hsu

(10) Patent No.: US 10,549,258 B2
(45) Date of Patent: Feb. 4, 2020

(54) DEHUMIDIFYING CAKE

(71) Applicant: Tsang-Hung Hsu, Tainan (TW)

(72) Inventor: Tsang-Hung Hsu, Tainan (TW)

( * ) Notice: Subject to any disclaimer, the term of this patent is extended or adjusted under 35 U.S.C. 154(b) by 64 days.

(21) Appl. No.: 16/003,300

(22) Filed: Jun. 8, 2018

(65) Prior Publication Data

US 2019/0374926 A1 Dec. 12, 2019

(51) Int. Cl.
*B01J 20/10* (2006.01)
*B01D 53/26* (2006.01)
*B01D 53/28* (2006.01)
*B01J 20/28* (2006.01)
*B01J 20/30* (2006.01)

(52) U.S. Cl.
CPC .......... *B01J 20/103* (2013.01); *B01D 53/261* (2013.01); *B01D 53/28* (2013.01); *B01J 20/2803* (2013.01); *B01J 20/28047* (2013.01); *B01J 20/3007* (2013.01); *B01J 20/3042* (2013.01); *B01J 20/3078* (2013.01); *B01D 2253/106* (2013.01)

(58) Field of Classification Search
CPC ...... B01J 20/10; B01J 20/103; B01J 20/2803; B01J 20/28047; B01J 20/3007; B01J 20/3042; B01J 20/3078; B01D 53/261; B01D 53/28; B01D 2253/106
USPC .......................................... 502/402
See application file for complete search history.

(56) References Cited

U.S. PATENT DOCUMENTS

2016/0030918 A1\* 2/2016 Kaimoto ................ B01J 20/046
428/315.7

\* cited by examiner

*Primary Examiner* — Edward M Johnson
(74) *Attorney, Agent, or Firm* — Rosenberg, Klein & Lee

(57) ABSTRACT

A dehumidifying cake is disclosed herein. It comprises a silica gel ($SiO_2$) ground to form an absorptive micro-powder and mixed with a water-based adhesive for a molding process, a baking process and a cooling process sequentially to form a pre-shaped dehumidifying cake with a plurality of pores.

3 Claims, 4 Drawing Sheets

DEHUMIDIFYING CAKE

BACKGROUND OF THE INVENTION

1. Field of the Invention

The present invention relates to provide a dehumidifying cake which has a pre-shaped structure and a plurality of pores without the need of any packing casings and can be formed as a variety of shapes that attract consumers.

2. Description of Related Art

Mold belongs to a kind of fungus that is widely found in nature. Mold easily grows in poorly ventilated and humid environments and has strong reproductive capacity. It is known that food, clothing, and furniture in a poorly ventilated and humid environment are prone to dampness and mildew, resulting in adverse effects on human health. Accordingly, various dehumidification products are produced in response to the need to reduce the humidity in the environment, keep the environment in a dry condition and reduce mold breeding.

Generally, the dehumidification products can be classified into two types. One is a condensing dehumidifier placed at a certain place and operated by electricity. The condensing dehumidifier with large size is not easy to carry and usually used to reduce the humidity in a large space. The other is about certain chemical substances having the property of easily absorbing water molecules in the air, e.g. calcium chloride. Such dehumidification product, e.g. moisture-proof bag in a food packaging or moisture-proof box in a closet, is usually placed in a confined space and requires continuous replenishment due to the consumption of chemical substances, so it is inconvenient in use. Furthermore, some dehumidifying boxes are divided into upper and lower accommodation spaces. The upper layer is used to accommodate granular calcium chloride, while the lower layer is used to collect the liquid absorbed by the upper layer. The collected liquid also contains chemical substance, e.g. calcium chloride. If the dehumidifying box is accidentally knocked over, the collected liquid which is difficult to remove may come into contact with surrounding objects. The collected liquid may also cause inflammation, such as redness, swelling and pain in human skin if the human body contacts it. Additionally, the liquid containing calcium chloride is often directly poured into the drainage system by users, causing a serious environmental pollution.

Recently, a reusable dehumidification product has been developed, which is mainly provided with a box-shaped or bag-shaped packing shell, and then filled with granular moisture-absorbing material (with a diameter of about 2 to 3 mm) in the packing shell so as to absorb moisture in the air. After the moisture-absorbing material fully absorbs moisture, the packing shell filled with the moisture-absorbing material can be placed in an oven or a microwave oven to dry up the moisture-absorbing material for reduction reaction. As a result, the moisture-absorbing material can re-absorb moisture to achieve effect of reuse.

Although the abovementioned product achieves the effects of repeatable dehumidification, however, there is still some distance from perfection.

For instance, the packing shell or the packing bag of the product must be made of plastic or cloth, which increases the cost and carbon footprint of manufacturing and causes disposal problem later on. Furthermore, the packing shell or the packing bag can be easily damaged by the high temperature of the oven or the microwave oven when it is dried inappropriately, which leads to a serious shortening of the product life.

SUMMARY OF THE INVENTION

In view of the above-mentioned problems, the object of the present invention is to provide a dehumidifying cake with a plurality of pores mainly by mixing a miniaturized and ground material of silica gel ($SiO_2$) with a water-based adhesive for moulding and drying so as to form a dehumidification cake with the plurality of pores. The dehumidifying cake has a hygroscopic effect and no need to use packing bags or packing casings for package, so the present invention can increase cost and environmental benefits simultaneously.

Disclosed herein is a dehumidifying cake. It comprises a silica gel ($SiO_2$) and a water-based adhesive, wherein the silica gel ($SiO_2$) is ground to form an absorptive micro-powder with particle size of between 25 to 250 mesh, and further thoroughly mixed with the water-based adhesive at a weight ratio of 80 wt %-98 wt %:20 wt %-2 wt % for a predetermined shape by moulding and for a baking process and a cooling process sequentially to form a pre-shaped dehumidifying cake with a plurality of pores.

According to the embodiment of the present invention, the water-based adhesive is selected from one of the group consisting of acrylic resin emulsion, polyvinyl acetate emulsion, polyvinyl alcohol (PVA), polyvinyl pyrrolidone (PVP), starch slurry, natural cellulose slurry, artificial synthetic cellulose slurry, edible gel, mineral slurry, and pulp.

According to an embodiment of the present invention, the baking process is carried out at a temperature of 100° C. to 400° C. for 1 to 4 hours.

Accordingly, the dehumidifying cake of the present invention in block shape does not need any packing casings in use and it can also be formed as various shapes, which avoid resource waste and further promote economic efficiency.

DETAILED DESCRIPTION OF THE PREFERRED EMBODIMENT

Hereinafter, an exemplary embodiment of the present invention will be described in detail with reference to the accompanying drawings.

Figure 1:
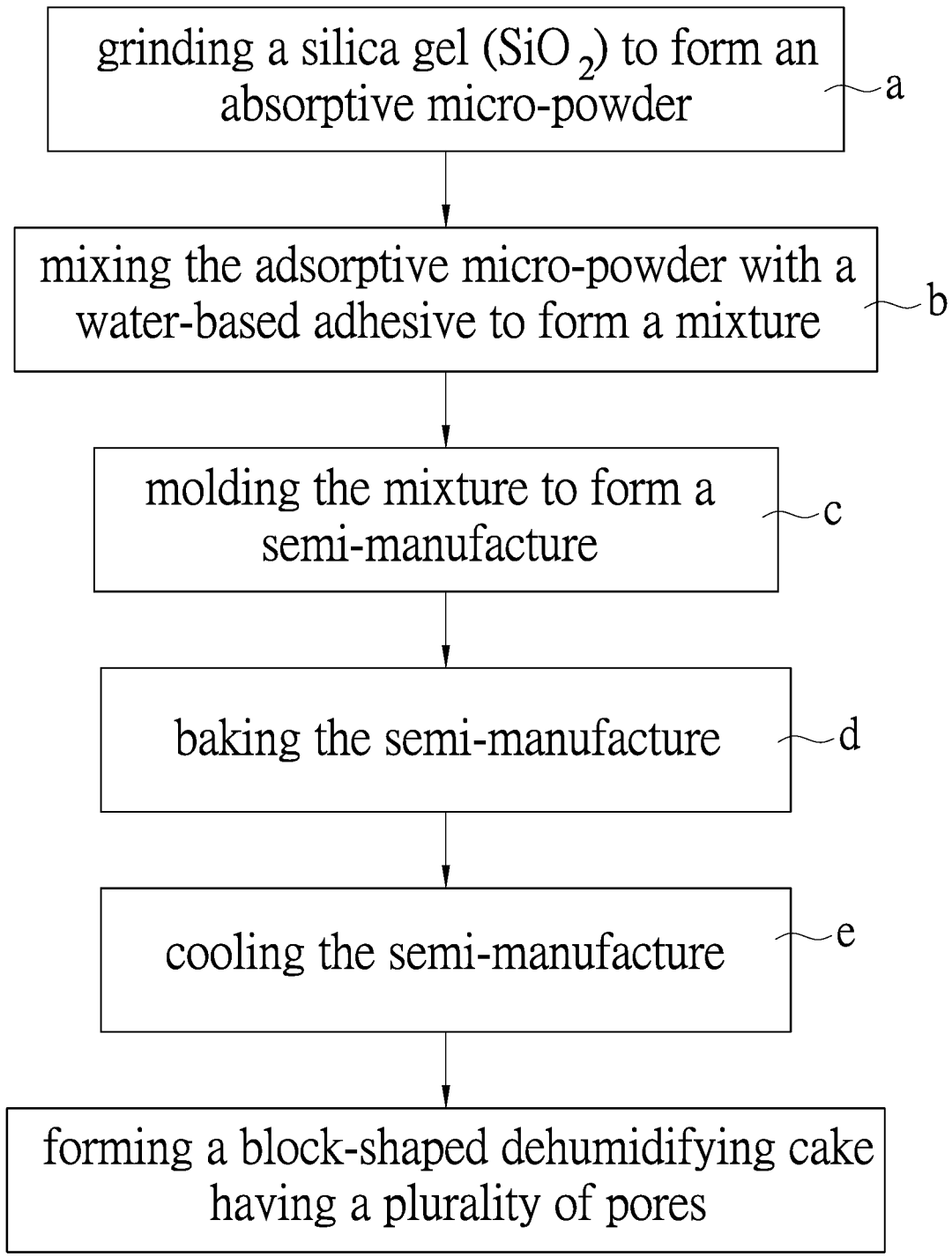
FIG. 1 is a flow chart of preparation of a dehumidifying cake according to the present invention.

As showed in FIG. 1, a flow chart of preparation of a dehumidifying cake according to the present invention is disclosed. The dehumidifying cake mainly comprises a silica gel ($SiO_2$) and a water-based adhesive. The silica gel ($SiO_2$) is ground to form an absorptive micro-powder having a particle size of between 25 to 250 mesh and further thoroughly mixed with the water-based adhesive at a weight ratio of 80 wt %-98 wt %:20 wt %-2 wt % for a predetermined shape by moulding and for a baking process and a cooling process sequentially to form a pre-shaped dehumidifying cake with a plurality of pores. A preparation method of the dehumidifying cake comprises the steps of:

(a) grinding a silica gel ($SiO_2$) to form an absorptive micro-powder with particle size of between 25 to 250 mesh;

(b) thoroughly mixing the absorptive micro-powder with a water-based adhesive with a plurality of pores at a weight ratio of 80 wt %-98 wt %:20 wt %-2 wt % to form a mixture; preferably, the water-based adhesive is selected from one of the group consisting of acrylic resin emulsion, polyvinyl acetate emulsion, polyvinyl alcohol (PVA), polyvinyl pyrrolidone (PVP), starch slurry, natural cellulose slurry, artificial synthetic cellulose slurry, edible gel, mineral slurry, and pulp;

(c) conducting a molding process on the mixture to form a semi-manufacture of the pre-shaped dehumidifying cake;

(d) conducting a baking process to the semi-manufacture of the dehumidifying cake at a temperature of 100° C. to 400° C. for 1 to 4 hours; and (e) conducting a cooling process to the semi-manufacture of the dehumidifying cake.

By a mixture of the porous absorptive micro-powder and the water-based adhesive in specific weight ratios, only a small amount of the water-based adhesive is used to adhere and aggregate the porous absorptive micro-powder. Although the water-based adhesive may be filled into the pores of the absorptive micro-powder when they both are mixed together, the moisture of the water-based adhesive after the baking is evaporated so that the plurality of pores of the absorptive micro-powder can be regenerated.

In addition, after the porous absorbent micro-powder and the water-based adhesive are adhered and aggregated, the inter particle space of each porous absorptive micro-powder is filled with the water-based adhesive, but a large number of pores are formed by the moisture evaporation path of the baking process. Through the plurality of pores, the total surface area of the absorptive body of the pre-shaped dehumidifying cake can be increased to provide a good moisture absorption effect.

Figure 2:
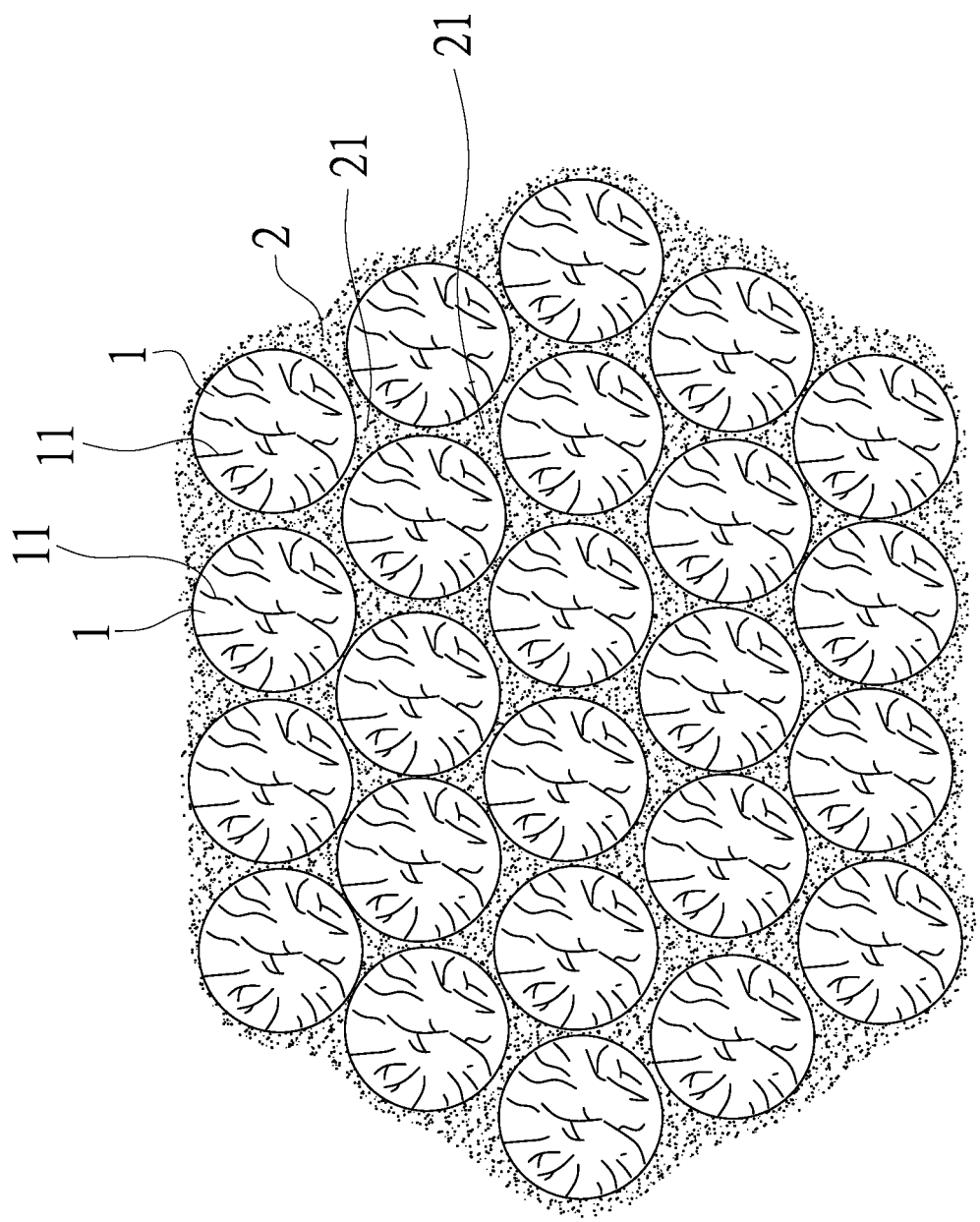
FIG. 2 is an enlarged view showing a dehumidifying cake according to the present invention, formed by an adhesion and aggregation of absorptive micro-powders and a water-based adhesive.

Referring to FIG. 2, an enlarged view showing an adhesion and aggregation of a plurality of absorptive micro-powders and a water-based adhesive to form a dehumidifying cake according to the present invention is revealed. The dehumidifying cake comprises an absorptive body made of absorptive micro-powder (1) and a water-based adhesive (2). The absorptive micro-powder (1) is provide with a plurality of pores (11), and a plurality of pores (21) are formed inside the water-based adhesive (2) due to moisture evaporating path of the water-based adhesive (2) in the baking process of the semi-manufacture of the dehumidifying cake. As shown in FIG. 2, the water-based adhesive (2) adheres and aggregates the absorptive micro-powders (1) and retains the structure with the plurality of pores (11). The water-based adhesive (2) also has a large number of pores (21) due to moisture evaporation, so the total surface area of the absorptive body of the pre-shaped dehumidifying cake can be increased.

Figure 3:
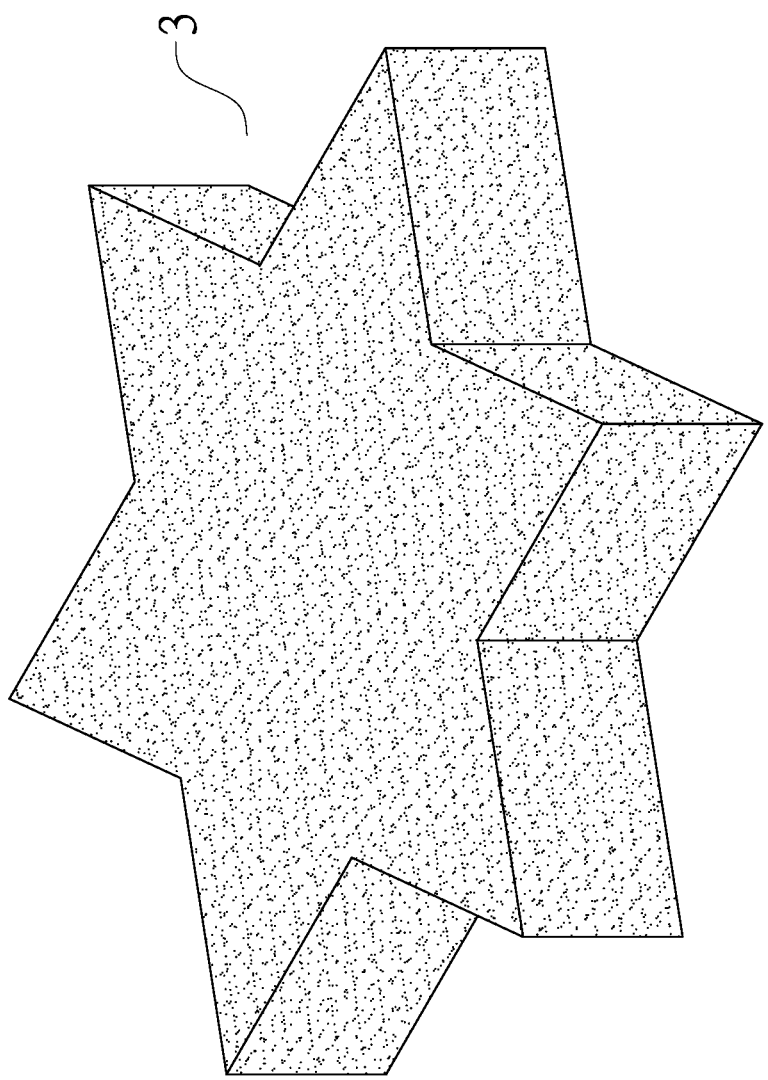
FIG. 3 is a schematic diagram showing a dehumidifying cake moulded into a star-shaped block according to the present invention.
Figure 4:
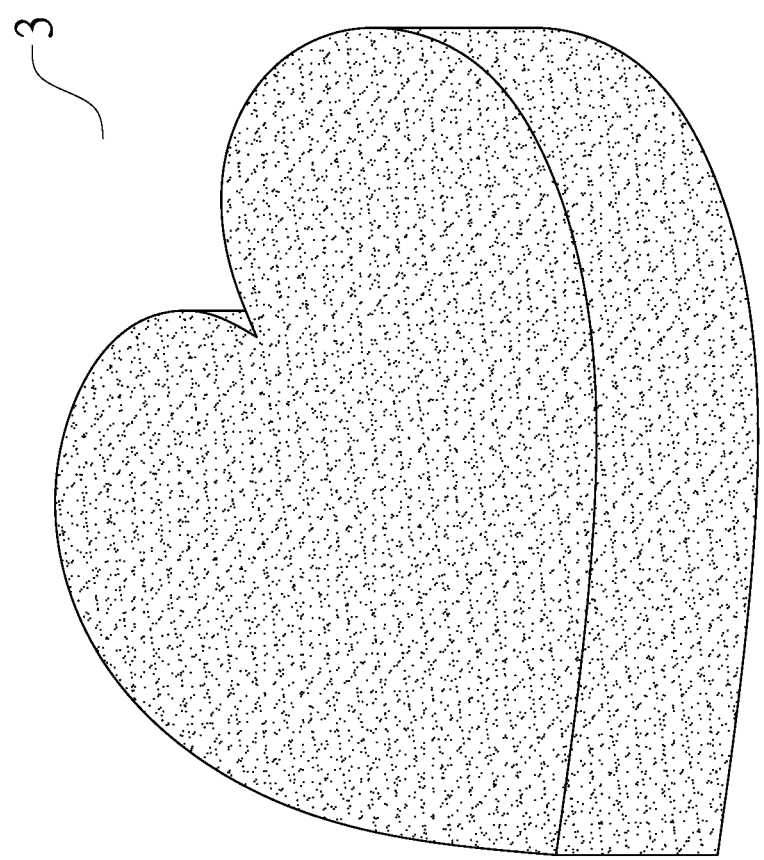
FIG. 4 is a schematic diagram showing a dehumidifying cake moulded into a heart-shaped block according to the present invention.

Referring to FIG. 3 and FIG. 4, a schematic diagram showing a dehumidifying cake molded into a star-shaped block and a schematic diagram showing a dehumidifying cake molded into a heart-shaped block are disclosed. The dehumidifying cake (3) with specific shapes can be directly placed or hung in a cabinet for dehumidification. After the dehumidifying cake (3) fully absorbs moisture, it can be dried so that the dehumidifying cakes (3) can be repeatedly used.

What is claimed is:

1. A dehumidifying cake, comprising:
a silica gel ($SiO_2$) and a water-based adhesive, wherein the silica gel ($SiO_2$) is ground to form an absorptive micro-powder with particle size of between 25 to 250 mesh, and further thoroughly mixed with the water-based adhesive at a weight ratio of 80 wt %-98 wt %:20 wt %-2 wt % for a predetermined shape by moulding and for a baking process and a cooling process sequentially to form a pre-shaped dehumidifying cake with a plurality of pores.

2. The dehumidifying cake as claimed in claim 1, wherein the water-based adhesive is selected from one of the group consisting of acrylic resin emulsion, polyvinyl acetate emulsion, polyvinyl alcohol (PVA), polyvinyl pyrrolidone (PVP), starch slurry, natural cellulose slurry, artificial synthetic cellulose slurry, edible gel, mineral slurry, and pulp.

3. The dehumidifying cake as claimed in claim 2, wherein the baking process is carried out at a temperature of 100° C. to 400° C. for 1 to 4 hours.

* * * * *